United States Patent

Jarczyk

[15] 3,637,413

[45] Jan. 25, 1972

[54] LUMINESCENT SCREEN AND METHOD OF MAKING THE SAME

[72] Inventor: Heinrich Jarczyk, Gross Bieberau, Germany

[73] Assignee: Fernseh GmbH, Darmstadt, Germany

[22] Filed: May 31, 1968

[21] Appl. No.: 733,281

[30] Foreign Application Priority Data

June 8, 1967 Germany......................P 15 89 787.7

[52] U.S. Cl....................................117/33.5 CS, 117/33.5 C
[51] Int. Cl..........................................................H01j 31/12
[58] Field of Search..................................................117/33.5

[56] References Cited

UNITED STATES PATENTS 2,402,900  6/1946  Koller....................................117/33.5

Primary Examiner—Alfred L. Leavitt
Assistant Examiner—Wayne F. Cyron
Attorney—Michael S. Striker

[57] ABSTRACT

A luminescent screen free of binder material is produced in an electron discharge device by introducing into the envelope of the electron discharge device a suspension of a phosphor in a settling liquid in which a relatively small proportion of a swellable organic colloid is distributed which is capable of being decomposed with complete volatilization. The phosphor of the suspension is then allowed to settle in the envelope so as to form therein a phosphor layer which will include a portion of the settling liquid and the colloid. The settling liquid is then removed and the residual layer is heated in the envelope at an elevated temperature and for a period of time sufficient to cause volatilization of the colloid so that a phosphor layer remains which is free of binder material.

8 Claims, No Drawings

LUMINESCENT SCREEN AND METHOD OF MAKING THE SAME

BACKGROUND OF THE INVENTION

This invention relates to the manufacture of luminescent screens which in finished condition are free from binding material.

The luminescent screens of present day television picture tubes and oscillograph tubes generally are secured to the glass envelope by means of an inorganic binding material which lodges between the grains of fluorescent material, absorbs a part of the excitation energy of the electrons and thus reduces the light yield of the screen. In larger accumulations the inorganic binding material may give rise to black spots in the luminescent screen. In addition, screens made with these binding materials can be removed only by the use of hydrofluoric acid, which is disadvantageous when it is desired to reuse the glass envelope.

The binding materials predominately used in large-scale manufacture of fluorescent screens are potassium or sodium silicate, which are added as aqueous solutions during the sedimentation of the luminescent material. In addition, solutions containing barium salts may be added and sometimes acetic acid or an acetate or another substance is employed as a precipitant or as an adhesive substance.

Because of the disadvantages of these methods which are set out above, it has already been attempted to make luminescent screens using only organic binding materials. To this end luminescent layers have been applied by the spraying method to substrates of, for example, glass, metal, or mica, which are then built into the tubes as completed luminescent screens, the phosphor being secured to the substrate by means of organic binding materials (nitrocellulose, methylacrylate). In these methods, however, two-thirds of the phosphor is lost; the screens possess a rather high optical contact, which may be have a disadvantageous effect upon the contrast of pictures produced on the luminescent screen.

It is an object of the invention to seek to solve the problem of preparing a luminescent screen free from binding material by the preferred method of sedimentation.

SUMMARY OF THE INVENTION

The present invention proposes a method of producing in an electron discharge device a luminescent screen free of binder material, comprising the steps of introducing into the envelope of an electron discharge device a suspension of a phosphor in a settling liquid having distributed therethrough a relatively small proportion of an organic colloid which is capable of swelling in the settling liquid and also capable of being thermally decomposed without leaving a nongaseous residue, allowing the phosphor of the suspension to settle in the envelope so as to form therein a layer of the phosphor including a portion of the settling liquid and the colloid, substantially removing the settling liquid, and heating the residual layer in the envelope at an elevated temperature and for a period of time sufficient to cause gasification of the colloid of the layer.

Preferably, the relatively small proportion of the colloid will be equal to between about 0.001 and 0.1 percent of the weight of the settling liquid and the settling liquid, preferably, is water of very high purity. Excellently suitable colloids capable of swelling in water are gelatine and cellulose methyl ester.

However, it is also possible to utilize other combinations of colloids and settling liquids, for instance nitrocellulose as the colloid and an organic solvent for nitrocellulose such as methanol as the settling liquid.

It is also within the scope of the present invention, after forming the settled layer of the phosphor, to apply thereto a lacquer film and than to form on the lacquer film by vapor deposition, in per se conventional manner, an aluminum layer, followed by heating which heating simultaneously will remove the lacquer layer and the colloid contained in the phosphor layer.

The present invention is also concerned with an electron discharge device which includes a luminescent screen consisting essentially of a phosphor and being free of a binder material, such as may be produced in accordance with the present invention. The phosphor preferably will be a sulfide, zinc oxide or willemite phosphor.

DESCRIPTION OF THE PREFERRED EMBODIMENTS

According to the present invention, organic binder materials are utilized which are capable of acting as colloidal adhesives between phosphor particles and glass but which undergo gas-forming decompositions at temperatures not exceeding a maximum of 400° C. Since in any case the collodion or the like lacquer layer necessary for aluminizing the luminescent screen is heated to temperatures between 380° and 400° C., no additional thermal treatment is required to decompose the phosphor binding colloid in accordance with the present invention. Organic binders of this kind are, for example, nitrocellulose (collodion), gelatine, methylcellulose and similar compounds.

According to the present invention there is provided a method for the manufacture of a luminescent screen by settling a phosphor from a suspension within the envelope of an electron discharge device, wherein there is added to the suspension of a phosphor in a settling liquid a small quantity, preferably amounting to from 0.001 to 0.1 percent by weight of the liquid, of an organic colloid capable of swelling in the settling liquid and which can be thermally decomposed without solid or liquid residue, and wherein after the removal of the liquid the precipitate is heated to a temperature sufficiently high so that the colloid will volatilize in gaseous form.

It has been found that screens produced by settling in the manner described above with the help of a soluble organic colloid possess good adhesion to the envelope, a high light yield and an optical contact which is suitable for producing high values of contrast.

According to a preferred embodiment of the invention the settling liquid is water of high purity and the binding material gelatin. Good results have also been obtained with aqueous solutions of cellulose methyl ester. According to another embodiment of the present invention the settling liquid is methanol or another organic fluid, and nitrocellulose is employed as the colloid, preferably specifically the same type of nitrocellulose which is also employed to produce the collodion film for aluminizing the phosphor screen. In this case, however, the luminescent screen must be dried after the settling of the phosphor layer and then a certain quantity of water introduced to act as a cushioning liquid for the collodion layer. This step in the method may be omitted when the settling liquid is water.

The following examples are given as illustrative only, without, however, limiting the invention to the specific details of the examples.

EXAMPLE I

Nitrocellulose as the Binder

A concentrated nitrocellulose lacquer is first prepared and is then thinned with a suitable quantity of methanol and the phosphor is suspended in this thinned lacquer. A collodion solution suitable for preparing the lacquer foil for supporting the aluminum film is mixed in methanol to a dilution of 1:200 and the phosphor is suspended in this. The same volume of methanol is introduced into the envelope as a cushioning layer and the phosphor suspension is spraying on the surface of the methanol. After a settlement time of four hours the luminescent screen has sufficient adhesion and the overlying methanol solution can be decanted. It is advantageous first to dry the screen in air and then in a drying cabinet at 80° C. in order to improve the adhesion. To aluminize the screen, a small quantity of water is carefully introduced into the envelope, onto which a drop of a collodion solution is deposited. After withdrawal of the water in known manner, the aluminum layer is deposited upon the collodion layer which has been formed and finally the binding material of the phosphor and the collodion film are decomposed and evaporated by heating between about 380° and 400° C.

EXAMPLE II

Gelatin as Binder

Because of its solubility in water and good adhesion gelatin is a very suitable binding means and may be used as an adhesive between the phosphor and the glass wall, and between the phosphor particles in the manufacture of the screen. It has been found that a solution in water of 0.005 to 0.1 percent by weight of gelatin may be used as a stock solution.

Two hundred to 400 ml. of water are mixed with 2 to 5 ml. of this stock solution and the phosphor shaken up in it. 200 to 300 ml. of water are introduced into the tube envelope as a cushioning layer and the phosphor suspension is then sprayed in known manner upon this layer. Very uniform and securely adhered screens may thus be produced. For an addition of 1 ml. of gelatin solution (0.1 percent) the total amount of liquid preferably should not exceed 300 ml. if an adhesion sufficient for normal usage of the picture tube is to be produced. Pure commercial gelatin may be used as the starting material. To eliminate inorganic salts which may be present, the gelatin solution may be first subjected to further purification, for instance, by dialysis in a bag of a material permitting the passage of inorganic substances, in a manner well known in colloid chemistry. Additions of dilute acids are not detrimental to the screen production. Alkalis and salts, however, have a disadvantageous effect. Acetic acid, formic acid and trimethylamine appear to oppose the formation of large aggregates of phosphor grains.

EXAMPLE III

Methyl Cellulose as Binder

Methyl cellulose or cellulose methyl ether is a water-soluble substance which after evaporation or vaporization of the water remains as an organic film. The degree of etherization determines the solubility in water; of the three available OH groups associated with each glucose anhydride only one or two should be etherified. In 2 percent solution the cellulose derivatives of the ether described (obtainable from the firm of WALSRODE under the type designation MC 1500) exhibited viscosities between 1,200 and 1,800 centipoises. A 1 percent aqueous solution serves as stock solution of the binder for screen manufacture. To 300 to 400 ml. of the settling liquid 1 to 5 ml. of this stock solution were added in order to obtain the desired screen adhesion. After settling, the major portion of the liquid is removed by suction. The residual layer is provided in conventional manner with a lacquer film, and this film is dried and aluminized as known to those skilled in the art. Intermediate drying such as was necessary in the manufacture of screens using a nitrocellulose binder, is not necessary when gelatin or methyl cellulose binders are employed.

EXAMPLE IV

The Baking-Out Process

Heating of the binder in order to remove it is advantageously effected simultaneously with the removal of the lacquer film after aluminizing. The bake-out temperature is the same, and thus lies in the range of 350° to 400° C. Since additional organic material is present in the envelope, longer and more careful heating must be employed. Because of the longer or more intense heating the danger exists of producing excessive oxidation of the aluminum layer. It is therefore advantageous to bring the tube envelope rapidly to a temperature of 380° C. and to maintain it at this temperature for 15 to 20 minutes. This method eliminates excessive oxidation even with relatively thin aluminum layers and makes possible decomposition of the organic substance without residue.

The advantages of the invention include, on the one hand, a particularly simple technique for manufacturing luminescent screens which is accompanied by a considerable saving in labor and thus the method is very suitable for mass production and, on the other hand, an improved quality of the screen as regards light yield and picture contrast. As regards the first advantage, the new process eliminates the need for additional chemicals, such as water-glass, alkaline earth salts and so on. The required quantity of the swellable colloid is so small that it need not be considered economically. The envelopes can be cleaned again without the use of hydrofluoric acid if the screen is defective; and discharged liquid does not contaminate the drainage system, since the colloid content is almost completely deposited upon the phosphor particles of the screen. The method of the present invention gives excellent results with sulfide phosphors and also with zinc oxide and willemite phosphors. The adhesion of zinc oxide screens is particularly good.

The optical characteristics of the screens are considerably improved. Since inactive substances are no longer present on the surfaces of the phosphor bodies, an increased light yield is obtained. The optical contact of the phosphor particles with the glass screen is noticeably improved, which has an advantageous effect on increasing picture resolution.

A further reason for the high light yield appears to be an increased density of the screen, since, on the one hand, owing to the good conditions for settlement, agglomeration of the grains into rapidly sinking lumps no longer occurs and, on the other hand, the swollen colloid shrinks considerably and drying and occasions consolidation of the screen gaps. The good adhesion appears to arise in part from this.

The method may therefore be employed for tubes with luminescent screens such as, for example, television picture tubes, television scanning and recording tubes, color television tubes and also fluorescent lamps.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of producing in an electron discharge device a luminescent screen free of binder material, comprising the steps of introducing into the envelope of an electron discharge device a suspension of a phosphor in pure water as a settling liquid having distributed therethrough a relatively small proportion of an organic colloid which is capable of swelling in water and also capable of being thermally decomposed without leaving a nongaseous residue; allowing said phosphor of said suspension to settle in said envelope so as to form therein a layer of said phosphor including a portion of said settling liquid and said colloid; substantially removing said settling liquid; and heating the residual layer in said envelope at a temperature at least as high as the decomposition temperature of the colloid of said layer and below the softening to cause gasification of the colloid of said layer.

2. A method as defined in claim 1, wherein said relatively small proportion of said colloid is equal to between about 0.001 and 0.1 percent of the weight of said settling liquid.

3. A method as defined in claim 2, wherein said colloid is gelatin.

4. A method as defined in claim 2, wherein said colloid is cellulose methyl ester.

5. A method as defined in claim 1, wherein prior to substantial removal of said settling liquid and to heating of said residual layer a lacquer film is formed thereon and an aluminum layer is applied to said lacquer film by vapor deposition, and thereafter heating is carried out so as to simultaneously remove said lacquer layer and said colloid contained in said phosphor layer.

6. A method as defined in claim 11 wherein said residual layer is heated to a temperature of at least 350° C.

7. A method as defined in claim 11 wherein said residual layer is heated to a temperature between 380° and 400° C.

8. A method as described in claim 11, wherein a member of the group consisting of acetic acid, formic acid and trimethyl amine is added to the water to prevent the deposition of large aggregates of phosphor grains.

* * * * *